(12) United States Patent
Kim et al.

(10) Patent No.: US 10,084,850 B2
(45) Date of Patent: Sep. 25, 2018

(54) TERMINAL APPARATUS, SERVER AND METHOD OF CONTROLLING THE SAME

(71) Applicant: Samsung Electronics Co., Ltd., Gyeonggi-do (KR)

(72) Inventors: Yu-na Kim, Gyeonggi-do (KR); O-hoon Kwon, Gyeonggi-do (KR); Sun-bal Kim, Daejeon (KR); Hyung-rai Oh, Gyeonggi-do (KR); Seung-hyun Yoon, Gyeonggi-do (KR); Soon-Back Cha, Gyeonggi-do (KR); Ju-youn Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 168 days.

(21) Appl. No.: 14/250,081

(22) Filed: Apr. 10, 2014

(65) Prior Publication Data
US 2014/0310337 A1   Oct. 16, 2014

(30) Foreign Application Priority Data

Apr. 10, 2013   (KR) .................. 10-2013-0039427

(51) Int. Cl.
*G06F 15/16*   (2006.01)
*H04L 29/08*   (2006.01)
*G06Q 10/10*   (2012.01)

(52) U.S. Cl.
CPC ............. *H04L 67/10* (2013.01); *G06Q 10/10* (2013.01)

(58) Field of Classification Search
CPC ....................................................... H04L 67/10
USPC ......................................... 709/203, 206, 231
See application file for complete search history.

(56) References Cited

U.S. PATENT DOCUMENTS

| 7,590,696 | B1 | 9/2009 | Odell et al. |
| 7,974,877 | B2 | 7/2011 | Ramanathan et al. |
| 9,420,435 | B2 | 8/2016 | Kim et al. |
| 2001/0017753 | A1 | 8/2001 | Mori et al. |
| 2006/0293903 | A1 | 12/2006 | Ramanathan et al. |
| 2008/0143052 | A1* | 6/2008 | Paslawski ............ A63B 63/007 273/350 |

(Continued)

FOREIGN PATENT DOCUMENTS

| CN | 101527896 | 9/2009 |
| CN | 101897204 | 11/2010 |

(Continued)

OTHER PUBLICATIONS

Korean Office Action dated Nov. 16, 2016 issued in counterpart application No. 10-2013-0039427, 18 pages.

(Continued)

*Primary Examiner* — Duyen Doan
(74) *Attorney, Agent, or Firm* — The Farrell Law Firm, P.C.

(57) ABSTRACT

A terminal apparatus provides shared profile information that is selectively received from a server based on a relationship between a first user and a second user, according to whether information of the second user is stored in the terminal apparatus of the first user as local profile information and information of the first user is stored in the terminal apparatus of the second user as the local profile information. Accordingly, a phonebook service for desired profile information is provided only for users in a buddy relationship sharing contact information with each other.

24 Claims, 16 Drawing Sheets

(56) References Cited

U.S. PATENT DOCUMENTS

| | | | | |
|---|---|---|---|---|
| 2009/0143052 A1* | 6/2009 | Bates | ............... | G06F 17/30575 455/414.2 |
| 2009/0157732 A1* | 6/2009 | Hao | ................. | H04M 3/53325 |
| 2009/0171760 A1* | 7/2009 | Aarnio | ................... | G06Q 30/02 705/14.66 |
| 2010/0082539 A1* | 4/2010 | Bostrom | ............. | G06Q 10/107 707/621 |
| 2010/0306185 A1* | 12/2010 | Smith | ................. | G06Q 10/107 707/709 |
| 2010/0317322 A1* | 12/2010 | Underwood | ........... | G06Q 10/10 455/410 |
| 2012/0066084 A1* | 3/2012 | Sneyders | ............... | G06Q 30/02 705/26.1 |
| 2012/0303652 A1* | 11/2012 | Tseng | ..................... | G06Q 30/02 707/769 |
| 2013/0060853 A1 | 3/2013 | Kim et al. | | |
| 2013/0217365 A1* | 8/2013 | Ramnani | ............... | H04L 67/306 455/414.1 |

FOREIGN PATENT DOCUMENTS

| | | |
|---|---|---|
| CN | 102438214 | 5/2012 |
| EP | 2 568 685 | 3/2013 |
| KR | 100775567 | 11/2007 |
| KR | 1020080020991 | 3/2008 |
| KR | 100820026 | 4/2008 |
| KR | 1020090013257 | 2/2009 |
| KR | 1020120046410 | 5/2012 |
| KR | 1020120086771 | 8/2012 |
| KR | 1020130033491 | 4/2013 |
| WO | WO 2004/049113 | 6/2004 |
| WO | WO 2010/002355 | 1/2010 |

OTHER PUBLICATIONS

Anonymous, "Pleasure of Making Bright World Ppeum's IT Story", Naver Blog, http://blog.naver.com/PostView.nhn?blogId=ktk350&logNo=100178685078, Feb. 4, 2013.

Korean Office Action dated May 16, 2017 issued in counterpart application No. 10-2013-0039427, 18 pages.

Australian Examination Report dated Aug. 4, 2017 issued in counterpart application No. 2014200631, 7 pages.

Chinese Office Action dated Nov. 28, 2017 issued in counterpart application No. 201410085759.4, 28 pages.

European Search Report dated Jan. 19, 2018 issued in counterpart application No. 14154718.2-1217, 8 pages.

Australian Examination Report dated Dec. 21, 2017 issued in counterpart application No. 2014200631, 5 pages.

Chinese Office Action dated Aug. 3, 2018 issued in counterpart application No. 201410085759.4, 24 pages.

European Summons to Attend Oral Proceedings dated Jul. 5, 2018 issued in counterpart application No. 14154718.2-1217, 10 pages.

\* cited by examiner

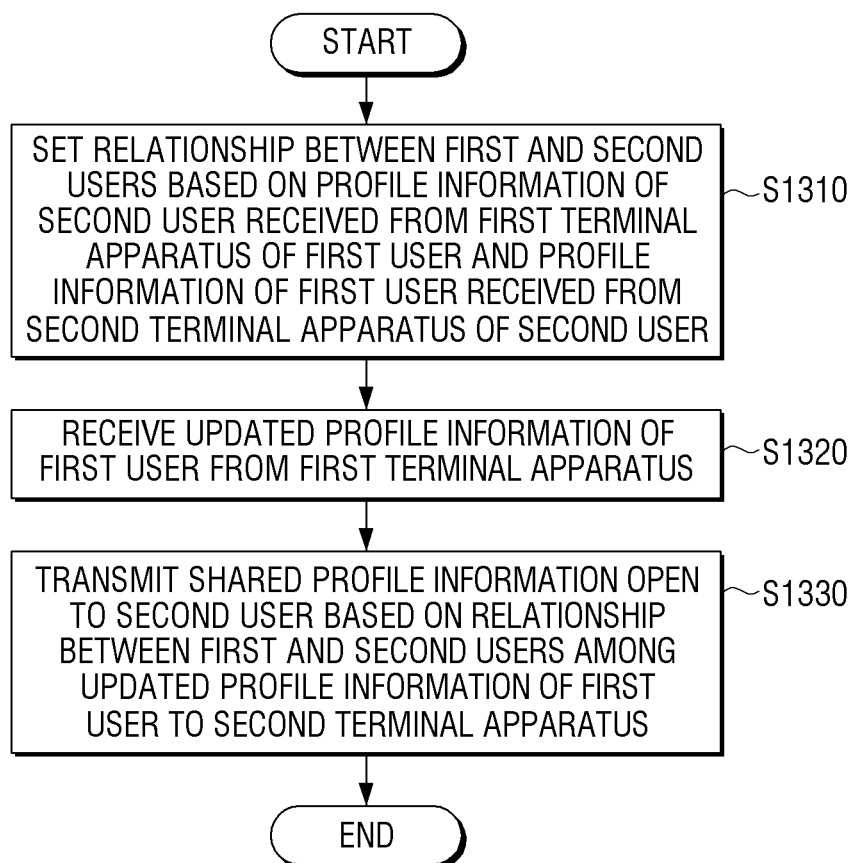

TERMINAL APPARATUS, SERVER AND METHOD OF CONTROLLING THE SAME

PRIORITY

This application claims priority under 35 U.S.C. 119(a) to Korean Patent Application No. 10-2013-0039427, filed in the Korean Intellectual Property Office on Apr. 10, 2013, the entire contents of which are incorporated herein by reference.

BACKGROUND OF THE INVENTION

1. Field of the Invention

The present invention relates generally to a terminal apparatus, a server and a method of controlling the same, and more particularly, to a terminal apparatus providing a phonebook service, a server and a method of controlling the same.

2. Description of the Related Art

Various types of display apparatuses are being developed in the current proliferation of electronics technology. In particular, display apparatuses such as a Television (TV), a Personal Computer (PC), a laptop computer, a tablet PC, a cellular phone, and an MPEG Layer Audio 3 (MP3) player have become common in most households.

To meet the needs of users desires for various functions, there has been introduced a phonebook service maintaining recent data by automatically updating a changed item when the changed item is generated in information registered in personal contact information of a portable terminal such as a tablet PC and a cellular phone.

However, the existing phonebook service cannot reflect various situation changes, such as contact information changing in a terminal, and the existing phonebook service updates contact information without any specific standard, which is a user inconvenience.

SUMMARY OF THE INVENTION

The present invention has been made in an effort to solve the above-described problems in the prior art, and it is an aspect of the present invention to provide a terminal apparatus, a server and a method of controlling the same that provide a phonebook service that automatically updates only a profile open to users meeting a predetermined standard.

According to an aspect of the present invention, a user terminal apparatus includes a display device, a storing device configured to store local profile information of a second user, a communicating device configured to transmit at least part of the local profile information to a server and receive shared profile information of the second user from the server based on a relationship between the first user and the second user, and a control device configured to control the display device in order to display a UI (User Interface) screen including the local profile information of the second user and at least part of the shared profile information of the second user that is different from the local profile information of the second user, wherein the shared profile information is selectively received from the server based on the relationship between the first user and the second user according to whether information of the second user is stored in the terminal apparatus of the first user as the local profile information and information of the first user is stored in the terminal apparatus of the second user as the local profile information.

According to another aspect of the present invention, a server includes a communicating device configured to communicate with a first terminal apparatus of a first user and a second terminal apparatus of a second user, and a control device configured to set a relationship between the first and second users based on profile information of the second user received from the first terminal apparatus and profile information of the first user received from the second terminal apparatus, wherein the control device transmits shared profile information open to the second user based on the relationship between the first and second users, among updated profile information of the first user, to the second terminal apparatus, when the updated profile information of the first user is received from the first terminal apparatus.

According to another aspect of the present invention, a method of controlling a terminal apparatus includes transmitting at least part of previously stored local profile information to a server, receiving shared profile information of another user from a server based on a relationship between the first user and the second user, and displaying a UI screen including local profile information of the second user and at least part of the shared profile information of the second user that is different from the local profile information of the second user, wherein the shared profile information is selectively received based on the relationship between the first user and the second user according to whether information of the second user is stored in the terminal apparatus of the first user as the local profile information and information of the first user is stored in the terminal apparatus of the second user as the local profile information.

According to another aspect of the present invention, a method of controlling a server includes setting a relationship between a first user and a second user based on profile information of a second user received from a first terminal apparatus of the first user and profile information of the first user received from a second terminal apparatus of the second user, and receiving updated profile information of the first user from the terminal apparatus and transmitting shared profile information open to the second user based on the relationship between the first and second users, among the updated profile information of the first user, to the second terminal apparatus.

According to another aspect of the present invention, a method of displaying a phonebook in a terminal apparatus of a first user includes storing local profile information of at least one second user, transmitting at least part of each of the local profile information of the at least one second user to a server, receiving shared profile information with respect to at least one buddy user among the at least one second user from the server, and displaying a new profile item that is different from the local profile information of the buddy user among the shared profile information of each of the at least one buddy user together with the local profile information of the at least one buddy user, wherein the at least one buddy user corresponds to a buddy terminal apparatus in which at least part of the profile information of the first user is stored as the local profile information, among the terminal apparatus of the at least one second user. is According to another aspect of the present invention, a terminal apparatus of a first user includes a display device, a storing device configured to store local profile information of at least one second user, a communicating device configured to transmit at least part of each of the local profile information of at least one second user to a server and receive shared profile information of at least one buddy user among the at least one second user from the server, and a control device configured to control the display device in order to display a new profile item that is different from the local profile information of the buddy user among the shared profile information of each of the at least one buddy user together with the local profile information of the at least one buddy user, wherein the at least one buddy user corresponds to a buddy terminal apparatus in which at least part of the profile information of the first user is stored as the local profile information, among the terminal apparatus of the at least one second user.

BRIEF DESCRIPTION OF THE DRAWINGS

The above and other aspects, features and advantages of certain embodiments of the present invention will be more apparent from the following detailed description in conjunction with the accompanying drawings, in which:

FIG. 13 illustrates a method of controlling a server according to an embodiment of the present invention.

DETAILED DESCRIPTION OF EMBODIMENTS OF THE INVENTION

Figure 1:
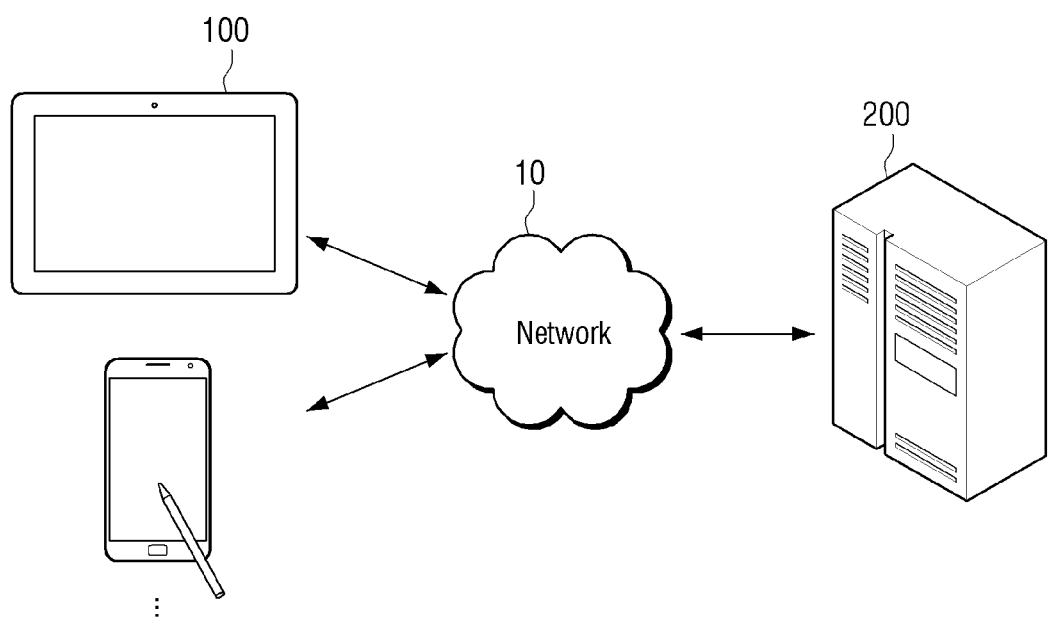
FIG. 1 illustrates a buddy managing system according to an embodiment of the present invention.

Hereinafter, embodiments of the present invention will be described in detail with reference to the accompanying drawings. In the accompanying drawings, the same reference numerals are used for the same constituent elements. A detailed description of well-known functions and structures incorporated herein is omitted to avoid obscuring the subject matter of the present invention.

FIG. 1 illustrates a buddy managing system according to an embodiment of the present invention.

According to FIG. 1, the buddy managing system includes a terminal apparatus 100 and a server 200.

The terminal apparatus 100 is realized with a cell phone such as a smart phone, but is not limited thereto, and it is realized with various types of portable devices having displaying function such as a tablet PC, a PMP (Portable Media Player), a PDA (Personal Data Assistant), and a navigation system. The terminal apparatus 100 includes a touch screen to execute a program using a user's finger or a pen (for example, a stylus pen).

The terminal apparatus 100 is configured to provide a phonebook service by communicating with the server 200 through a network 10. In particular, the phonebook service is provided in the form of an application which is directly used by a user on an OS (Operating System), and the application is provided in the form of an icon interface on a screen of the terminal apparatus 100. The phonebook service maintains recent data by automatically updating changed information when items of information registered in 'my contact information' is changed.

The server 200 provides the phonebook service through a phonebook application, and in particular, provides the phonebook service corresponding to a relationship set through mutual buddy relationship setting between users.

FIG. 2 illustrates a configuration of a terminal apparatus according to embodiments of the present invention.

Figure 2A:
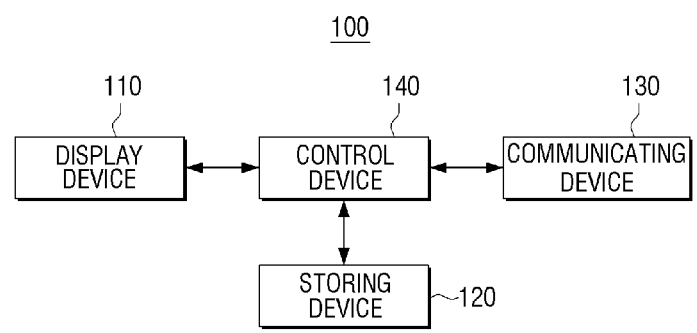
FIGS. 2A and 2B illustrate a configuration of a terminal apparatus according to various embodiments of the present invention.

FIG. 2A illustrates a configuration of a terminal apparatus according to an embodiment of the present invention.

According to FIG. 2A, the terminal apparatus 100 includes a display device 110, a storing device 120, a communicating device 130 and a control device 140.

The display device 110 displays a screen. The screen includes various contents such as an image, a moving picture, text, music, an application execution screen including the various contents, and a GUI (Graphic User Interface) screen.

In particular, the display device 110 displays various UI screens provided according to execution of the phonebook application according to an embodiment of the present invention. Various examples of the UI screen will be described with reference to the drawings.

The display device 110 is realized with an LCD (Liquid Crystal Display), an OLED (Organic Light Emitting Diodes) but is not limited thereto. In particular, the display device 110 is realized in the form of a touch screen forming a mutual layer structure with a touch pad. the display device 110 is used as the above-mentioned user interface device (not shown) besides an output device. The touch screen is configured to detect touch input pressure as well as touch input position and area.

The storing device 120 stores various data such as an O/S (Operating System) software module for driving the terminal apparatus 100, many applications, and many contents input or set during execution of the applications.

In particular, the storing device 120 stores profile information of another user (i.e., the second user). The profile information of the second user is directly input by the first user, but is not limited thereto, and is received from outside. For example, the profile information includes at least one of a telephone number, an e-mail address, a home address, a company name, company contact information, a status message, a profile picture, and a shared picture. Hereinafter, a profile of the second user stored in the storing device 120 of the terminal apparatus 100 is referred to as a local profile, for convenience of description. the first user herein refers to a primary user, and the second user refers to a secondary user who is different from the first user.

The storing device 120 stores profile information of the first user. The profile information of the first user is at least one of a telephone number automatically given by a communication company upon activation of a purchased product, or an e-mail address, an address, a birthday, a company name, company contact information, a status message, a profile picture, and a shared picture, input by the first user.

The communicating device 130 communicates with the server 200. In particular, the communicating device 130 communicates with the server 200 setting and managing a relationship between the first user and a second user based on the profile information of the second user received from the terminal apparatus 100 and the profile information of the second user received from the terminal apparatus (not shown) of the second user.

In particular, the communicating device 130 uploads the profile information of the second user stored in the storing device 120 to the server 200 according to control by the control device 140 described later. The communicating device 130 uploads the profile information of the first user to the server 200. For example, the profile information of the first user is uploaded to the server 200 upon subscribing to a service for using the phonebook application, and when the profile information is updated thereafter, the profile information is uploaded to the server 200.

The server 200 sets the first user and the second user as having a mutual buddy (hereinafter, buddy) relationship when at least part of the profile information of another user is received from the terminal apparatus 100 and at least part of the profile information of the first user is received from the terminal apparatus (not shown) of the second user. That is, when at least part of profile of the second user is stored in the terminal apparatus 100 of the first user and at least part of profile of the first user is stored in the terminal apparatus (not shown) of the second user, the first user and the second user is set as having the buddy relationship. The profile information affecting the setting of the buddy relationship between the first users is reliable profile information such as a telephone number, an e-mail address, a birthday, an address, and a group.

The server 200 transmits shared profile information of the second user in the buddy relationship with the first user to the terminal apparatus 100 of the first user in response to an event. The predetermined event is a periodic update request of the terminal apparatus 100, but it is not limited. For example, the predetermined event is a predetermined user manipulation such as running an application.

The shared profile information of the second user (buddy user) in the buddy relationship is profile information set to be open to the first user from a terminal apparatus (not shown) of the second user by the second user.

The control device 140 controls overall operations of the terminal apparatus 100.

The control device 140 communicates with the server 200 to update the profile information of the second user stored in the storing device 120. Hereinafter, the profile of the second user stored in the storing device 120 of the terminal apparatus 100 is named a local profile for convenience of description.

Specifically, the control device 140 may periodically request synchronization between the local profile of the second user and the shared profile stored in the server 200 with a predetermined period. However, this is just an example, and it is possible for the server 200 to automatically perform synchronization periodically or when an event occurs.

Thus, the control device 140 receives the shared profile information of the second user open to the first user based on the buddy relationship between the first user and the second user from the server 200.

That is, the server 200 provides the shared profile information of the second user in the buddy relationship with the first user of the terminal apparatus 100 to the terminal apparatus 100 when the synchronization request is received from the terminal apparatus 100.

The control device 140 displays the UI screen based on the shared profile information received from the server 200.

The control device 140 provides various UI screens corresponding to a user command, when the phonebook application is executed.

The control device 140 provides a UI screen simultaneously providing the shared profile information of the second user received from the server 200 in response to the predetermined event and the local profile information stored in the storing device 120 in one screen. For example, the control device 140 includes a first area including the local profile information of the second user, a second area including the shared profile information of the second user, and a GUI (Graphical User Interface) for adding the shared profile information of the second user in the second area to the first area.

Specifically, the control device 140 compares the shared profile information of the second user with the local profile information stored in the storing device 120 to provide only the shared profile information that is different from the local profile information by including only the shared profile information in the second area, when the shared profile information is received from the server 200. For example, the control device 140 compares each profile item of the shared profile information of the second user received from the server 200 with each profile item of the local profile information stored in the storing device 120 to omit matching profile items and provide only new profile items that are different from the local profile information as the shared profile information by including the new profile items in the second area.

The control device 140 configures the UI screen so that the first area and the second area are alternately disposed according to the item (or type) of the profile information.

For example, the control device 140 displays a shared profile item corresponding to a cell phone number in an area adjacent to a local profile item corresponding to the cell phone number, and displays a local profile item corresponding to an e-mail address in an area adjacent to a local profile item corresponding to the e-mail address.

The GUI for adding the shared profile information of the second user in the second area to the first area is individually provided with respect to each profile item. For example, a first GUI corresponding to a home telephone number item of the shared profile information and a second GUI corresponding to an e-mail address item of the shared profile information is respectively provided.

When the GUI for adding at least one profile item among the shared profile information of another user in the second area to the first area is selected, the control device 140 stores the selected profile item as the local profile information, simultaneously deletes the profile item, and adds the profile item to the first area to display the profile item.

The control device 140 compares respective profile items of the shared profile information of the second user received from the server 200 and the local profile information stored in the storing device 120 to omit matching profile items in displaying. That is, the control device 140 displays only profile items that are different from the local profile information stored in the storing device 120 among the shared profile information of the second user received from the server 200 in the second area. For example, when a home telephone number and an e-mail address are included in the shared profile information of the second user received from the server 200, and the home telephone number is identical to the local profile information but the e-mail address is not identical to the local profile information, the home telephone number is not provided and only the e-mail address is provided as the shared profile information.

In some cases, the control device 140 provides visual feedback with respect to the profile item matching the local profile information stored in the storing device 120 among the shared profile information of the second user received from the server 200. For example, the control device 140 displays the item matching the shared profile information of the second user received from the server 200 among the local profile information of the second user displayed in the first area as highlighted for a predetermined time so that the first user knows that the item is a new (or updated) profile item compared with the shared profile information received from the server 200. For example, in the example described above, the home telephone number matching the local profile information is not displayed in the second area and is displayed in the first area as highlighted for about one to two seconds so that the first user knows that the profile item is identical to the shared profile information received from the server 200.

The control device 140 provides a UI screen for inputting/correcting a user's own profile.

Specifically, the control device 140 provides a UI screen including a shared profile input area for inputting profile information open to the second user in the buddy relationship and a unshared profile input area for inputting private information not open to the second user. An open level of the profile information input through the UI screen is automatically set according to the input area and the profile information is transmitted to the server 200. In some cases, the control device 140 includes a contents input area for inputting contents to the profile information in the UI screen.

The control device 140 provides a UI screen displaying a contact history. For example, the control device 140 provides a UI screen including an area listing other users that are frequently contacted, and an area including an existing contact time and contact content of the first user. The UI screen includes an SMS in step Short Message Service) transmission/reception history, an e-mail transmission/reception history, and a telephone history.

The control device 140 provides a UI screen displaying news of the second user. For example, the control device 140 provides a UI screen including contents information updated by the second user, and an update time.

The control device 140 provides a UI screen related with a synchronization setting for synchronizing the local profile information stored in the storing device 120 and the shared profile information provided from the server 200.

In some cases, according to an option setting, the shared profile information received from the server 200 is not displayed or the local profile information stored in the terminal apparatus 100 is automatically updated as the received shared profile information.

When the terminal apparatus 100 is not connected to the server 200, profile information recently received from the server 200 is provided or the shared profile information is not displayed in the UI screen.

Figure 2B:
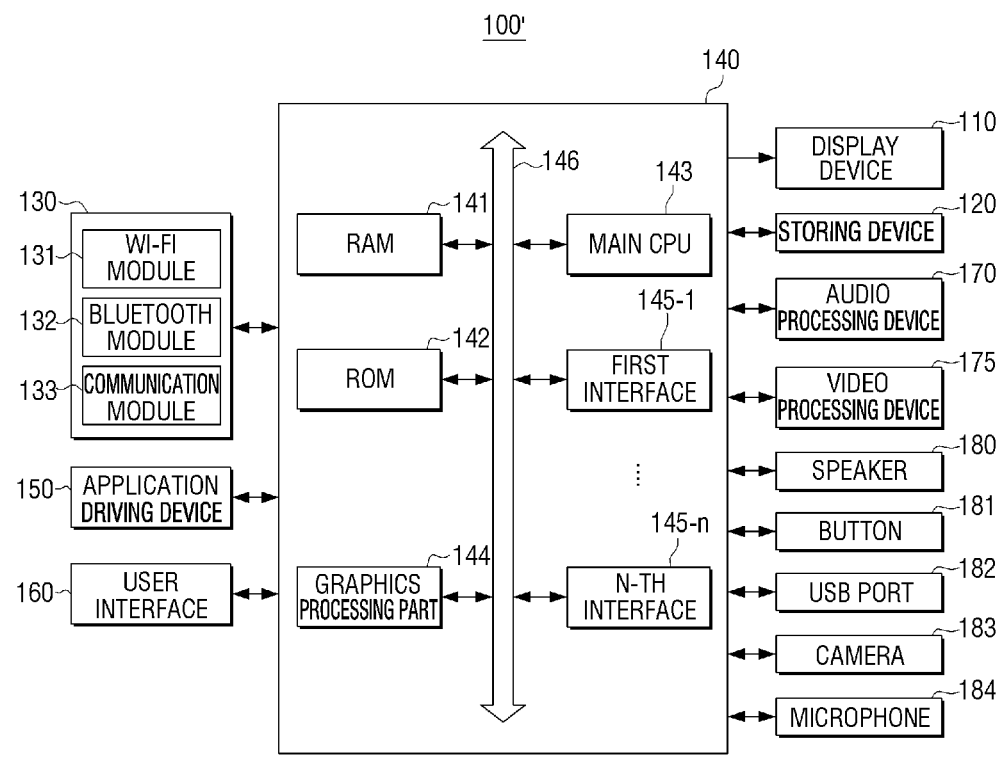

FIG. 2B illustrates a configuration of a terminal apparatus 100' according to another embodiment of the present invention. According to FIG. 2B, the terminal apparatus 100' includes a display device 110, a storing device 120, a communicating device 130, a control device 140, running an application driving device 150, a user interface device 160, an audio processing device 170, a video processing device 175, a speaker 180, a button 181, a USB (Universal Serial Bus) port 182, a camera 183 and a microphone 184. Detailed descriptions of parts shown FIG. 1 will be omitted from the following description of FIG. 2.

The communicating device 130 performs communication with an external device according to various types of communication methods. The communicating device 130 includes various communication chips such as a Wi-Fi chip 131, a Bluetooth® chip 132, and a wireless communication chip 133.

The Wi-Fi chip 131 and the Bluetooth® chip 132 perform communications in a Wi-Fi method and a Bluetooth® method, respectively. The wireless communication chip 133 performs communication according to various communication standards such as an IEEE standard, a Zig-Bee® standard, a 3G ($3^{rd}$ Generation) standard, a 3GPP ($3^{rd}$ generation partnership project) standard, and an LTE (Long Term Evolution) standard. The communicating device 130 may further include an NFC (Near Field Communication) chip (not shown) operating according to an NFC method using a 13.56 MHz bandwidth among various RFID frequency bandwidths such as 135 KHz, 13.56 MHz, 433 MHz, 860~960 MHz, and 2.45 GHz.

The communicating device 130 communicates with the server 200.

The application driving device 150 drives and performs the application provided from the terminal apparatus 100. The application refers to an executable application program and includes various multimedia contents. The 'multimedia contents' includes text, audio, a static image, an animation, video and interactive contents, EPG (Electronic Program Guide) contents from a contents provider, an electronic message received from users, and information related to a present event, but is not limited thereto.

In particular, the application driving device 150 may drive the phonebook application according to user manipulation to provide various phonebook services according to the present invention.

The first user interface device 160 receives various user instructions.

In particular, the first user interface device 160 receives various user manipulations with respect to the UI screen. For example, the first user interface device 160 receives various user manipulations such as a user command for displaying the UI screen with the shared profile information of the second user provided from the server 200 with the local profile information, and a user command for adding the shared profile information of the second user to the local profile information on the UI screen.

The audio processing device 170 is an element processing audio data. The audio processing device 170 performs various processes such as decoding, amplifying, and noise-filtering of the audio data.

The video processing device 175 processes video data. The video processing device 175 performs various image processes such as decoding, scaling, noise-filtering, frame rate conversion, and resolution conversion of the video data.

The speaker 180 is an element outputting many alarms, a voice message, as well as much of the audio data processed in the audio processing device 170.

The button 181 includes a mechanical button, a touch pad, a wheel, formed on a front portion, a side portion, or a rear portion of an external surface of a body. For example, a button for switching the terminal apparatus 100' on/off is formed.

The USB port 182 performs communication with many external devices or performs charging through a USB cable.

The camera 183 images a static image or a moving picture according to control by the first user. The camera 183 is realized as a plurality of cameras, such as a front surface camera and a rear surface camera.

The microphone 184 receives a user voice or other sounds to converting it into the audio data. The control device 140 may use the first user voice input through the microphone 184 in a process of call, or convert the first user voice to the audio data to store the audio data in the storing device 120.

When the camera 183 and the microphone 184 are formed, the control device 140 performs a control operation according to the first user voice input through the microphone 184 or a user motion recognized through the camera 183. That is, the terminal apparatus 100' is operated in a motion control mode or a voice control mode. When the terminal apparatus 100' is operated in the motion control mode, the control device 140 activates the camera 183 to image the first user, tracks motion change of the first user to perform a control operation corresponding to the motion change. When the terminal apparatus 100' is operated in the voice control mode, the control device 140 analyzes the first user voice input through the microphone 184 and performs a control operation according the analyzed user voice.

Various external input ports for connecting with various external terminals such as a headset, a mouse, a LAN, are included in the terminal apparatus 100'.

The control device 140 generally controls an operation of the terminal apparatus 100' using many programs stored in the storing device 120.

For example, the control device 140 executes the application stored in the storing device 120, configures a execution screen to display the execution screen, and plays various contents stored in the storing device 120. The control device 140 performs communication with external devices through the communicating device 130.

Specifically, the control device 140 includes a RAM (Random Access Memory) 141, a ROM (Read-Only Memory) 142, a main CPU (Central Processing Unit) 143, a graphics processing device 144, first to n-th interfaces 145-1 to **145-*n* and a bus 146**.

The RAM 141, the ROM, the main CPU 143, the graphics processing device 144, and the first to n-th interfaces 145-1 to **145-*n*, are connected with each other through the bus 146**.

The first to n-th interfaces 145-1 to **145-*n*** are connected with several elements described above. One of the interfaces is a network interface connected with an outside device through a network.

The main CPU 143 accesses the storing device 120 and boots the O/S (Operating System) stored in the storing device 120. Then, the main CPU 143 performs various operations using many programs, contents, and data, stored in the storing device 120.

An instruction set for booting a system is stored in the ROM 142. When a turn-on instruction is input and power is supplied, the main CPU 143 copies the O/S stored in the storing device 120 to the RAM 141 according to the instruction stored in the ROM 142, and executes the O/S to boot the system. When the booting is completed, the main CPU 143 copies many application programs stored in the storing device 120 and executes the application programs copied to the RAM 141 to perform many operations.

The graphics processing part 144 generates a screen including various objects such as an icon, an image, and text, using an operating device (not shown) and a rendering device (not shown). The operating device (not shown) operates a characteristic value such as a coordinate value, a type, a size, and a color of each of the objects according to a layout of the screen based on a received control instruction. The rendering device (not shown) generates various layout screens including the object based on the characteristic value operated in the operating device (not shown). The screen generated in the rendering device (not shown) is displayed in a display area of the display device 110.

The operation of the control device 140 described above is performed by the program stored in the storing device 120. Various data such as an O/S software module for driving the terminal apparatus 100', applications, and contents input or set during execution of the application, are stored in the storing device 120.

In particular, the storing device 120 stores the profile information input by the first user or received from outside.

Various software modules stored in the storing device 120 will be described later with reference to FIG. 3.

Although not shown in drawings, the terminal apparatus 100' may further include a sensing device and a feedback providing device.

The sensing device (not shown) senses various manipulations such as a touch, a rotation, an inclination, a pressure, and an access of the terminal apparatus 100.

In particular, the sensing device (not shown) includes a touch sensor sensing a touch. The touch sensor is realized as an electrostatic type or a decompression type. The electrostatic type uses a method in which when a portion of a body of the first user touches a surface of the display device 110, a touch coordinate is calculated by sensing a minute electrical current exiting the body of the first user, using a dielectric coated on the surface of the display device 110. The decompression type uses a method in which a touch coordinate is calculated by sensing a current due to contact between an upper plate and a lower plate at a touch point, when the first user touches the screen, by including two electrode plates.

As illustrated above, the touch sensor is realized in various manners, and may further include a geomagnetic sensor for sensing a rotation status and a moving direction of the terminal apparatus 100', and an acceleration sensor for sensing an inclination of the terminal apparatus 100'.

The feedback providing device (not shown) provides various feedback according to a function performed in the terminal apparatus 100'. In particular, the feedback-providing device (not shown) provides haptic feedback with respect to the GUI displayed on the screen. The haptic feedback refers to haptic computer technology that enables the first user to sense feedback by generating vibration, power and shock in the terminal apparatus 100'. For example, the feedback-providing device (not shown) provides the haptic feedback when the shared profile information of the second user received from the server 200 is stored as the local profile information by selection of the first user. The feedback-providing device (not shown) may provide various feedback by differently applying a vibration condition (for example, a vibration frequency, a vibration length, a vibration strength, a vibration wave, a vibration position.) according to the control of the control device 140. As a method for generating the various haptic feedbacks by differently applying the vibration type is conventional art, a detailed description thereof is omitted.

FIG. 2B shows detailed elements included in the terminal apparatus 100' according to an embodiment of the present invention. Some of the elements shown in FIG. 2B may be omitted or changed, and other elements may be added. For example, the terminal apparatus 100' may further include a GPS receiving device (not shown) for calculating a present position of the terminal apparatus 100' by receiving a GPS signal from a GPS satellite, or a DMB (Digital Multimedia Broadcasting) receiving device (not shown) for receiving and processing a DMB signal.

Figure 3:
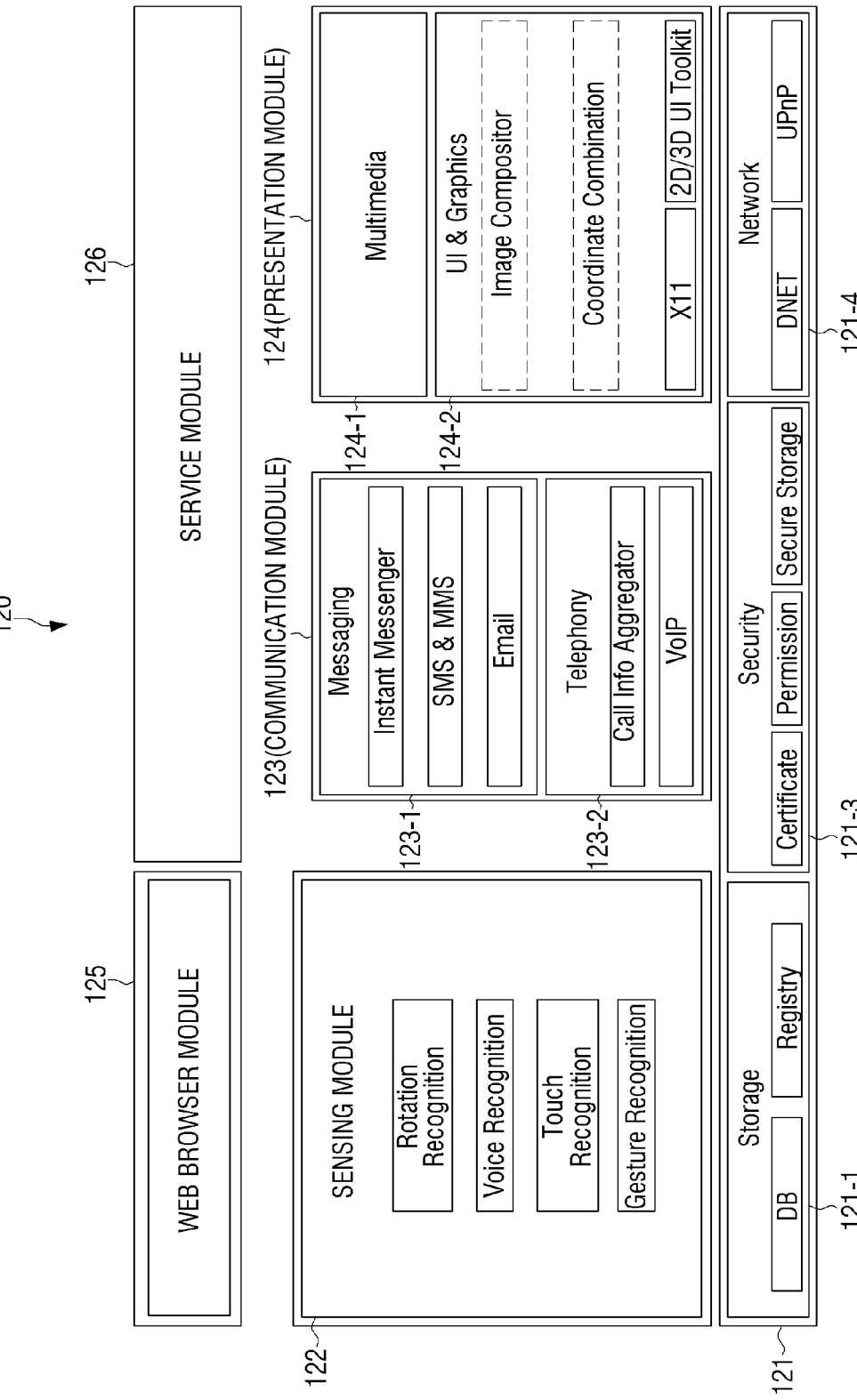
FIG. 3 illustrates a configuration of software stored in a storing device.

FIG. 3 illustrates a configuration of the software stored in the storing device 120.

According to FIG. 3, the storing device 120 stores software including a base module 121, a sensing module 122, a communication module, a presentation module 124, a web browser module 125, and a service module 126.

The base module 121 processes a signal transferred from hardware in the terminal apparatus 100 and transfers the signal to a high rank layer module. The base module 121 includes a storage module 121-1, a security module 121-2 and a network module 121-3. The storage module 121-1 manages a database DB or a registry. The main CPU 143 may access the database in the storing device 120 using the storage module 121-1 to read data. The security module 121-2 supports certification, permission requesting, and storage security, with respect to the hardware, and the network module 121-3 includes, for example, a DNET module or a UPnP module for supporting network connection.

The sensing module 122 collects information from many sensors, and analyzes and manages the collected information. The sensing module 122 includes a face recognition module, a voice recognition module, a motion recognition module, and an NFC recognition module.

The communication module 123 performs communication with the outside. The communication module 123 includes a messaging module 123-1 such as a messenger program, an SMS in step Short Message Service) & MMS (Multimedia Message Service) program, and an e-mail program and a telephone module 123-2 including a telephone information collector (call info aggregator) program module, and a VoIP (Voice over Internet Protocol) module.

The presentation module 124 configures a display screen. The presentation module 124 includes a multimedia module 124-1 for playing and outputting multimedia contents and a UI rendering module 124-2 performing UI and graphics processes. The multimedia module 124-1 includes a player module, a camcorder module, a sound processing module. Thus, the operations of generating a screen and playing a sound are performed by playing multimedia contents. The UI rendering module 124-2 includes an image compositor for combining an image, a coordinate combination module combining and generating coordinates on the screen on which the image is displayed, an X11 module receiving events from the hardware, and a 2D/3D (Two-Dimensional-Three Dimensional) UI toolkit providing a tool for forming a UI of a 2D or a 3D type.

The web browser module 125 is for web browsing to access a web server. The web browser module 125 includes various modules such as a web view module configuring a web page, a download agent module performing a download, a bookmark module, and a webkit module.

The service module 126 includes many applications for providing various services. Specifically, the service module 126 includes various program modules such as a navigation program, a contents playing program, a game program, an e-book program, a calendar program, an alarm-managing program, and other widgets. In particular, the service module 126 includes a program module providing the phonebook service according to an embodiment of the present invention.

In FIG. 3, various program modules are shown, but, some of the shown program modules are omitted or changed, and other program modules could be added according to a type and characteristics of the terminal apparatus 100. For example, the terminal apparatus 100 may further include a position-based module supporting a position-based service by connecting with hardware such as a GPS chip.

FIG. 4 illustrates a configuration of a server according to embodiments of the present invention.

Figure 4A:
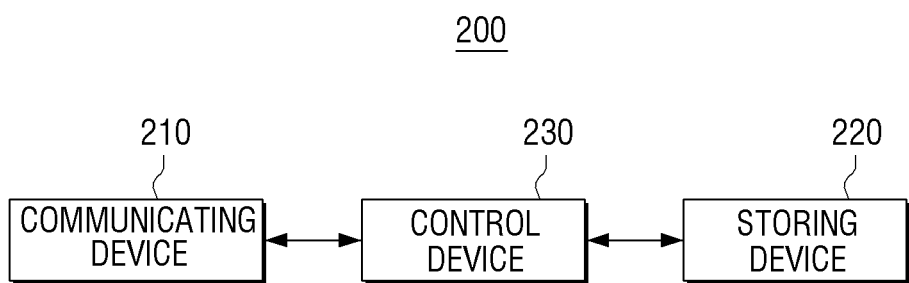
FIGS. 4A and 4B illustrate configurations of a server according to embodiments of the present invention.

FIG. 4A illustrates a configuration of a server according to an embodiment of the present invention. According to FIG. 4A, the server 200 includes a communicating device 210, a storing device 220 and a control device 230.

The communicating device 210 performs communication with the first terminal apparatus 100 and 100' of a first user and a second terminal apparatus (not shown) of a second user.

Specifically, the communicating device 210 receives profile information of the first and second users from the first terminal apparatus 100 and 100' and the second terminal apparatus (not shown). For example, the communicating device 210 receives local profile information of the second user and profile information of the first user from the first terminal apparatus 100 and 100' and receives profile information of the first user and local profile information of the second user from the second terminal apparatus (not shown).

In particular, the communicating device 210 receives updated profile information of the first user and profile information of the second user, respectively, from the first terminal apparatus 100 and 100' and the second terminal apparatus (not shown).

The communicating device 210 transmits shared profile information of another user open to each user according to a relationship between the first user and the second user to the terminal apparatus of each user.

A detailed configuration of the communicating device 210 is similar to the detailed configuration of the communicating device 130 illustrated in FIG. 2B, and thus detailed description of the communicating device 210 is omitted.

The storing device 220 stores the local profile information of the second user received from the first terminal apparatus 100 and 100' and the local profile information of the first user received from the second terminal apparatus (not shown).

The storing device 220 stores relationship information of the first and second users set based on the local profile information of the second user received from the first terminal apparatus 100 and 100' and the local profile information of the first user received from the second terminal apparatus (not shown).

Specifically, the storing device 220 stores a list of users set as having a buddy relationship based on the profile information received from the terminal apparatus of each user according to the control device 230 described later.

The control device 230 controls overall operation of the server 200. The control device 230 is realized in a form similar to a detailed configuration of the control device 140 illustrated in FIG. 2B, and thus detailed description of the control device 230 is omitted.

The control device 230 sets the relationship between the first and second users based on the local profile information of the second user received from the first terminal apparatus 100 and 100' and the local profile information of the first user received from the second terminal apparatus (not shown).

Specifically, the control device 230 sets the first user and the second user as having a mutual buddy (hereinafter, buddy) relationship, when at least part of the profile information of the second user is received from the first terminal apparatus 100 and 100' and at least part of the profile information of the first user is received from the second terminal apparatus (not shown). That is, when at least part of profile of the second user is stored in the first terminal apparatus 100 and at least part of profile of the first user is stored in the second terminal apparatus (not shown), the first and second users are set as having the buddy relationship. The profile information affecting the setting of the buddy relationship between the first users is reliable profile information such as a telephone number, an e-mail address, a birthday, an address, and a group.

The profile information used in the setting of the buddy relationship satisfies a predetermined condition for securing reliability. For example, misrepresentation of other people's telephone numbers or e-mail addresses is prevented, using a telephone number directly extracted from a SIM (Subscriber Identity Module) card of the terminal apparatus or certified through telephone certification, and using an e-mail address certified through e-mail certification. When two or more users set the telephone number or the e-mail address, certification is requested from the first user in order to set the telephone number or the e-mail address as the profile information of the certified user.

The control device 230 receives the profile information of the first user from the first terminal apparatus 100 and 100' and the profile information of the second user from the second terminal apparatus (not shown), and stores the profile information in the storing device 120. For example, the profile information of the first user is uploaded to the server 200 upon subscribing to a service for using the phonebook application, and when the profile information is updated thereafter, the updated profile information is uploaded to the server 200.

When the first and second users are set as having the buddy relationship, the control device 230 provides the shared profile information of the first user to the second terminal apparatus (now shown) and provides the shared profile information of the second user to the first terminal apparatus 100 and 100' in response to an event. The event is a periodic update request of the first terminal apparatus 100 and 100' or the second terminal apparatus (not shown), but is not limited thereto. The shared profile information refers to profile information set to be open to the first user in the buddy relationship from his/her own terminal apparatus, that is, the first terminal apparatus 100 and 100'.

When the shared profile is differently set according to a contact information group managed by the first user in each of the terminal apparatuses and the shared profile information divided according to the contact information group, the control device 230 may manage the shared profile information based on the relevant information. For example, the control device 230 controls the shared profile information by dividing the shared profile information and opening up the telephone number to a company colleague group and opening up the birthday, the address, and the home telephone number to a family group. The open level is set by the first user through a setting menu of each terminal apparatus.

When corrected unshared profile information of the first user is received from the first terminal apparatus 100 and 100', the control device 230 updates the information of the first user stored in the storing device 220 with the received unshared profile information and stores the updated information.

Figure 4B:
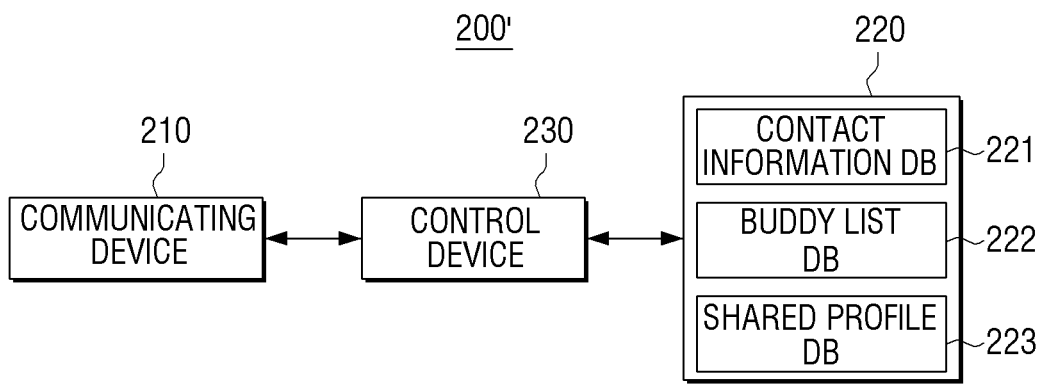

FIG. 4B illustrates a configuration of a server according to another embodiment of the present invention.

According to FIG. 4B, a server 200' includes a communicating device 210, a storing device 220 and a control device 230. Detailed description of elements illustrated in FIG. 4B that correspond to elements illustrated in FIG. 4A is omitted.

The storing device 220 includes a contact information DB (DataBase) 221, a buddy list DB 222 and a shared profile DB 223.

The contact information DB 221 stores user profile information received from each terminal apparatus. For example, the contact information DB 221 stores profile information satisfying a condition needed in a setting of a buddy relationship between users. For example, the contact information DB 221 stores a telephone number directly extracted from a SIM card of each terminal apparatus, a telephone number, and an e-mail address, certified through certification by a relevant service to which the first user subscribes.

When corrected user profile information is received from each terminal apparatus, the contact information DB 221 may update previously stored profile information and store the updated profile information.

The buddy list DB 222 stores user information about buddy relationships based on the profile information received from each terminal apparatus by listing the first user information. For example, the buddy list DB 222 stores a list of a user B and a user C set as having the buddy relationship with a user A, and a list of the first user A and a user D set as having the buddy relationship with the first user B.

The buddy list DB 222 stores contact information group information and open level information according to each contact information group received from each terminal apparatus. For example, among the first user B and the first user C set as having the buddy relationship with the first user A, the first user B is classified as the family group, and the first user C is classified as the company colleague group. The birthday, the address, the cell phone number and the home telephone number are open to the family group while only the cell phone number is open to the company colleague group. These contact information groups and the open level according to the group are set by the first user through a setting menu of each terminal apparatus, and the server 200 manages information by dividing the information set in each terminal apparatus.

The shared profile DB 223 stores the shared profile information received from each terminal apparatus by dividing the shared profile information according to terminal apparatus. For example, the shared profile DB 223 stores shared profile information open to another users having the buddy relationship with the first user A and shared profile information open to another users having the buddy relationship with the first user B.

FIG. 5 illustrates a configuration of a UI screen according to a first embodiment of the present invention.

Figure 5A:
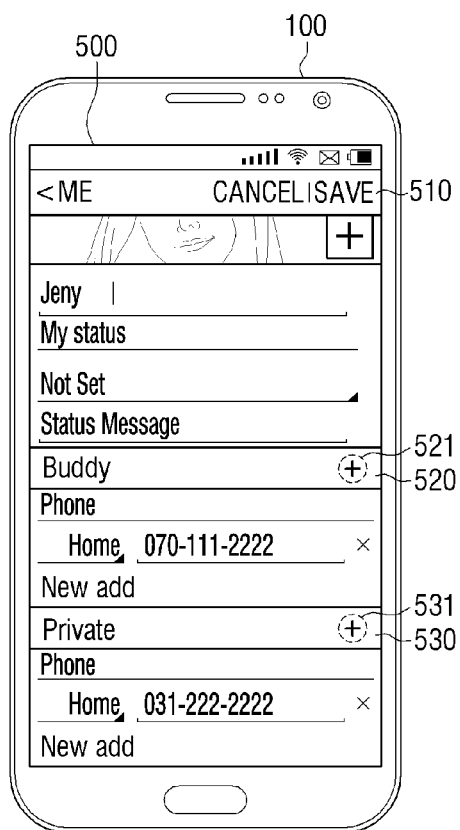
FIGS. 5A and 5B illustrate configurations of a UI screen according to a first embodiment of the present invention.

As shown in FIG. 5A, a UI screen 500 for inputting the first user profile provided from the terminal apparatus 100 or 100' according to an embodiment of the present invention includes an area 510 for inputting basic user profile information, an area 520 for inputting the shared profile information, and an area 530 for inputting the unshared (i.e. private) profile information.

The basic user profile information is for distinguishing the first user, such as a user name or a profile picture.

The shared profile information includes various types of information according to user setting, as profile information of the first user open to other users in the buddy relationship with the first user.

The unshared profile information also includes various types of information according to user setting, but as profile information of the first user not open to other users.

As shown, GUIs 521 and 531 are displayed for providing additional fields in the area 520 for inputting the shared profile information and the area 530 for inputting the unshared profile information.

Figure 5B:
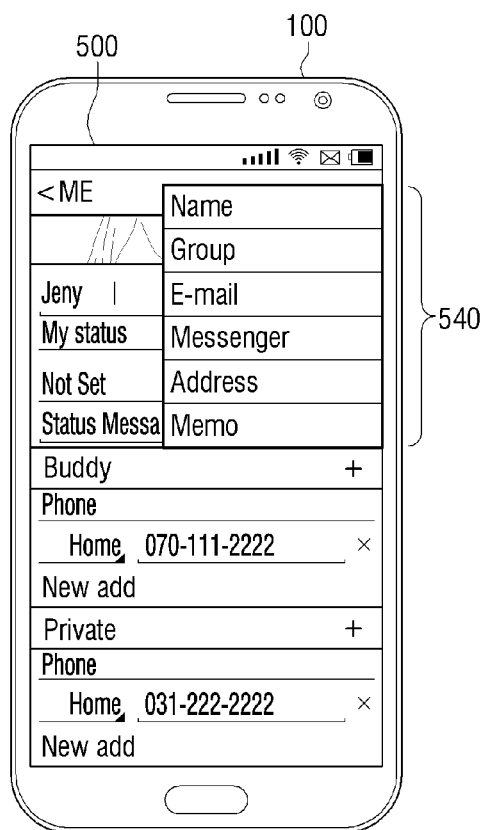

FIG. 5B shows a UI screen when the GUIs 521 and 531 are selected for providing the additional fields for inputting the first user profile information on the UI screen of FIG. 5A.

FIG. 5B illustrates a screen providing a field for inputting the first user profile information.

As shown in FIG. 5B, when the additional field-providing GUI 521 provided at the area 520 for inputting the shared profile information is selected, an area 540 including the additional field is provided above the relevant area.

FIG. 6 illustrates a configuration of a UI screen according to a second embodiment of the present invention.

Figure 6A:
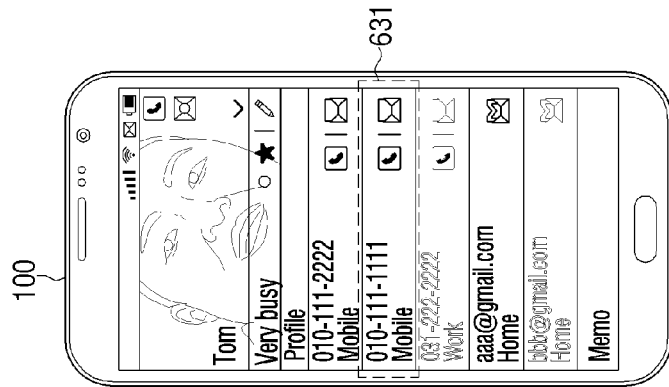
FIGS. 6A, 6B and 6C illustrate configurations of a UI screen according to a second embodiment of the present invention.

As shown in FIG. 6A, a UI screen including the profile information of the second user includes local profile displaying areas 611 and 612 displaying the local profile information stored in the terminal apparatus 100 and shared profile displaying areas 621 and 622 displaying the shared profile information received from the server 200. For example, as shown, the local profile information (for example, 010-111-2222) is displayed in activated status, the shared profile information (for example, 031-222-2222, 010-111-1111) is displayed in inactivated status, and only GUIs 621-1, 621-2 and 622-1 for adding the shared profile information to the local profile displaying areas 611 and 612 are displayed in activated status.

In an alternative embodiment, both of the local profile information and the shared profile information are displayed in activated status and in different types. For example, both of the local profile information and the shared profile information are displayed with different contrast, colors, and writing styles, in activated status.

In the activated status, user manipulations can be received and functions can be executed in response to the first user manipulations. Specifically, the activated status enables calling/transmitting a message due to a touch, gesture, and selection. For example, in the activated status a message transmitting application is executed when a flick is performed in a left direction, and a calling application is executed when a flick is performed in a right direction.

As shown, the local profile displaying areas 611 and 612 and the shared profile displaying areas 621 and 622 are alternately disposed according to profile information type. That is, the local profile displaying area 611 displaying a telephone number, the shared profile displaying area 621 displaying the telephone number, the local profile displaying area 612 displaying an e-mail address, and the local profile displaying area 622 displaying the e-mail are alternately disposed.

Figure 6B:
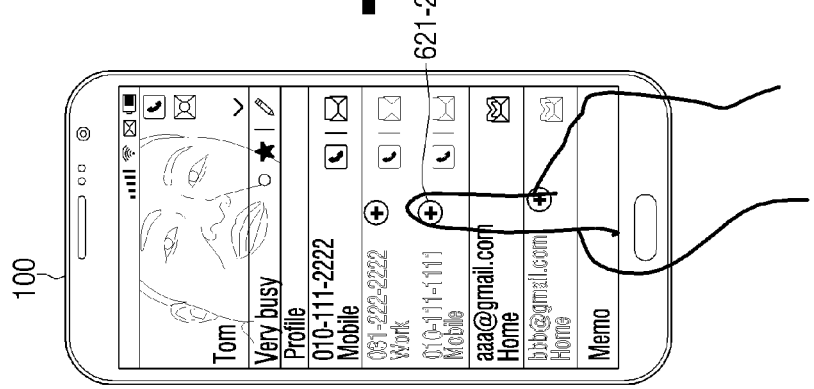
Figure 6C:
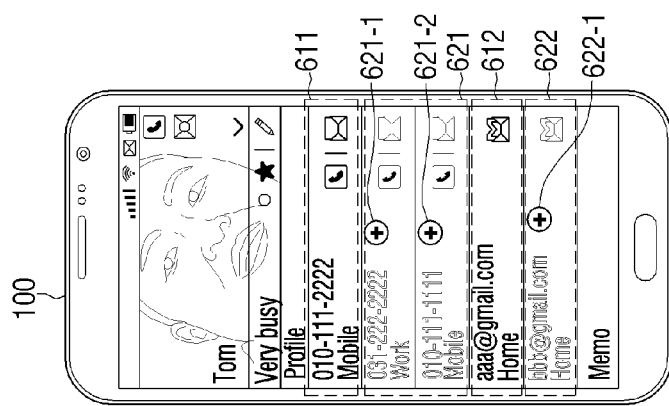

As shown in FIG. 6B, when a GUI for adding a part of the shared profile information in the shared profile displaying area 621 to the local profile displaying area 611 is selected, as shown in FIG. 6C, the shared profile information is additionally displayed in the local profile displaying area 611 while the shared profile information is deleted. The shared profile information added to the local profile displaying area 611 is displayed in activated status as other local profile information. The shared profile information added to the local profile displaying area 611 is stored in the terminal apparatus 100 as local.

Figure 7:
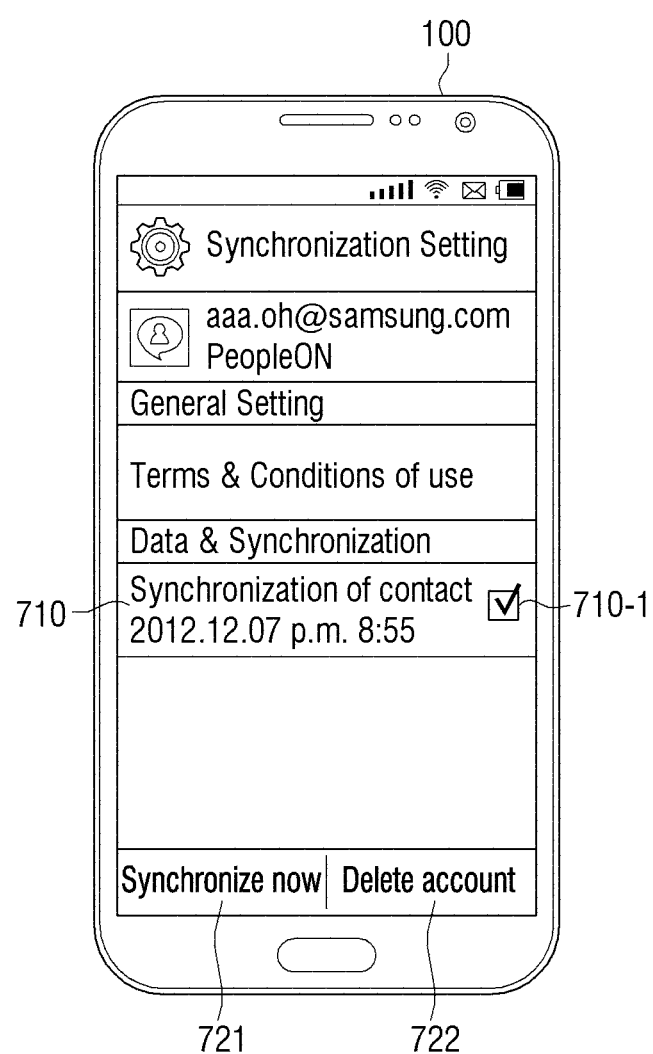
FIG. 7 illustrates a configuration of a UI screen according to a third embodiment of the present invention.

FIG. 7 illustrates a configuration of a UI screen according to a third embodiment of the present invention.

As shown in FIG. 7, the terminal apparatus 100 provides a UI screen for setting of contact information synchronization. For example, the UI screen includes an item 710-1 for setting contact information synchronization to be performed or not, an item 721 for directly performing the synchronization and an item 722 for deleting an account.

For example, when the first user selects the item 710-1 for setting the contact information synchronization to be or not to be performed, the terminal apparatus 100 may periodically synchronize the local profile information stored in the server 200 and the shared profile information provided from the server 200.

In an alternative embodiment, other setting items such as an item for setting a synchronization time point, are additionally included in the UI screen.

FIG. 8 illustrates a configuration of a UI screen according to a fourth embodiment of the present invention.

Figure 8A:
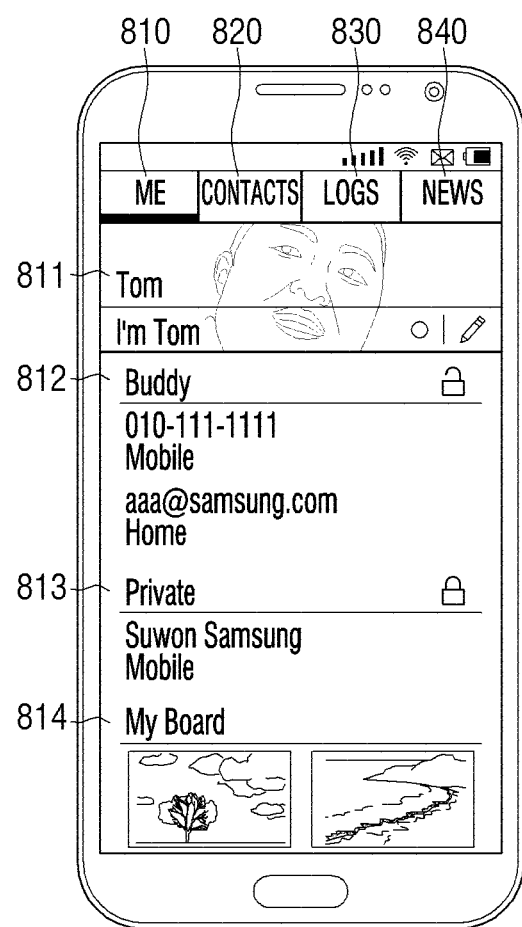
FIGS. 8A, 8B, 8C and 8D illustrate configurations of a UI screen according to a fourth embodiment of the present invention.

As shown in FIG. 8A, when the phonebook application according to the present invention is driven, a UI screen including a user's own profile display item 810, another user profile display item 820, a contact history display item 830 and another user's news display item 840 are provided.

FIG. 8A is a UI screen displayed when the first user own profile display item 810, for example a "ME" item, is selected. The UI screen includes items displaying basic user profile information 811, shared profile information 812, unshared profile information 813 and user contents information 814. The item displaying the first user contents information 814, for example, a "My Board" item, displays contents uploaded to the first user's own profile information by the first user. A detailed description of the other information is provided above and will not be repeated here. In the shared profile information 812 and the unshared profile information 813, icons 812-1 and 813-1 respectively showing opening and closing are displayed together.

Figure 8B:
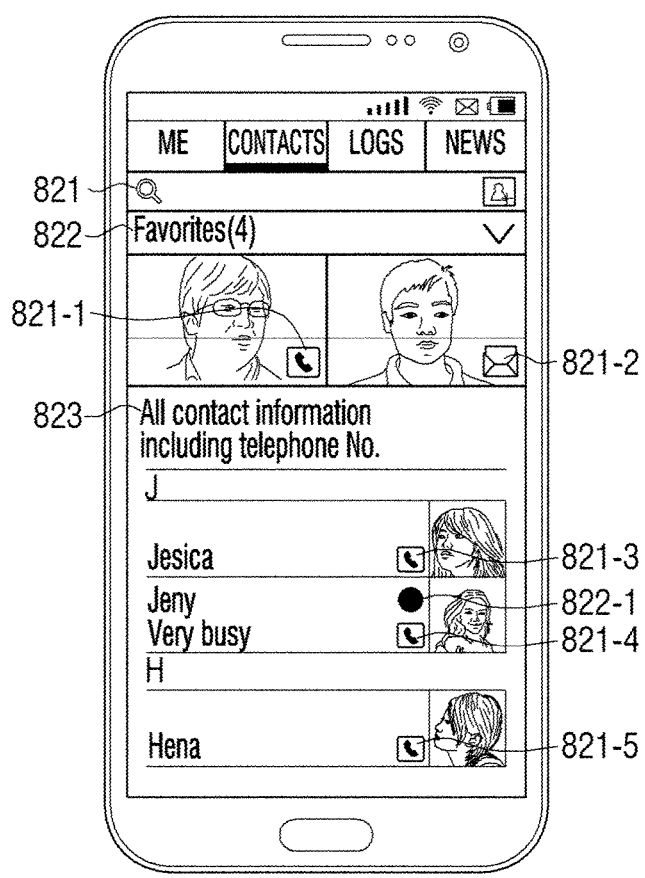

FIG. 8B is a UI screen displayed when the second user's profile display item, for example, a "CONTACTS" item, is selected. The UI screen includes a contact information search item 821, a contact information bookmark item 822, and an all contact information view item 823. GUIs 821-1 to 821-5 showing frequent means of contacting the second users are displayed, and a GUI 822-1 showing a present status is displayed when the second user sets his/her own present status. The UI screen includes an updated contact information view item displaying only the updated contact information by selecting the updated contact information.

Figure 8C:
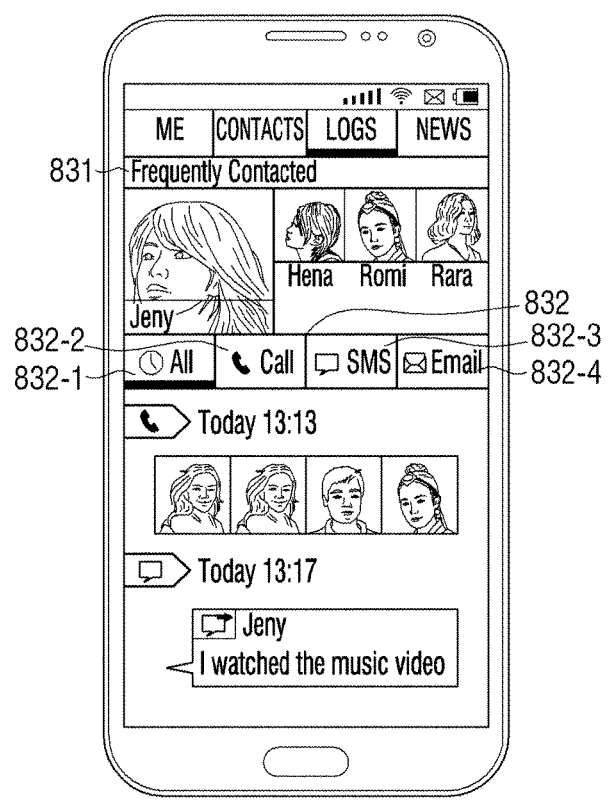

FIG. 8C is a UI screen displayed when the contact history item 830, for example, a "LOGS" item, is selected. The UI screen includes a high-frequency contact information view item 831 and a contact record view item 832.

Information of another users contacted frequently by the first user is displayed in the high-frequency contact information view item 831. For example, as shown, the most contacted other user is displayed in a different manner (for example, a different size) from the other users.

The contact record view item 832 includes an all contact record view item 832-1, an only telephone contact record view item 832-2, an only SMS record view item 832-3 and an only e-mail record view item 832-4.

Figure 8D:
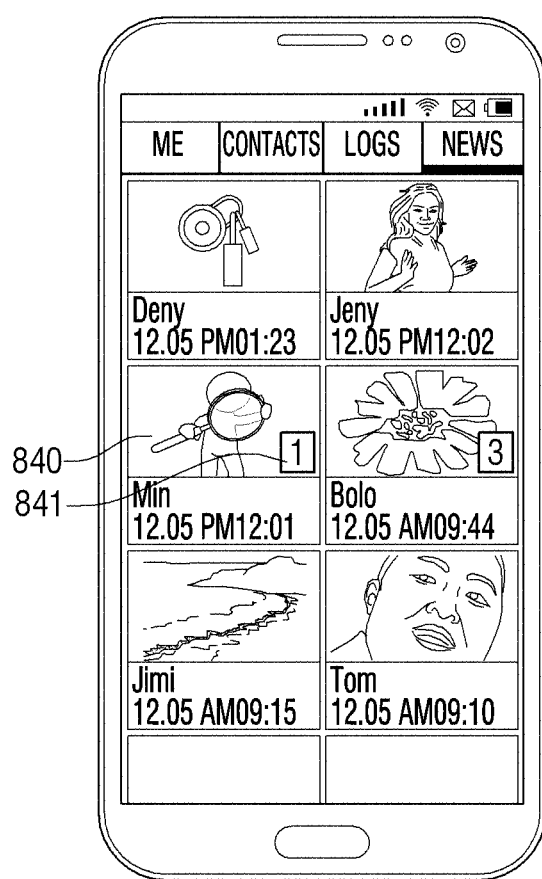

FIG. 8D is a UI screen displayed when the second user's news display item 840, for example, a "NEWS" item, is selected. The UI screen includes information of other users whose news is updated.

For example, as shown, a GUI 841 showing news is displayed in the basic user profile information of the other user.

Figure 9:
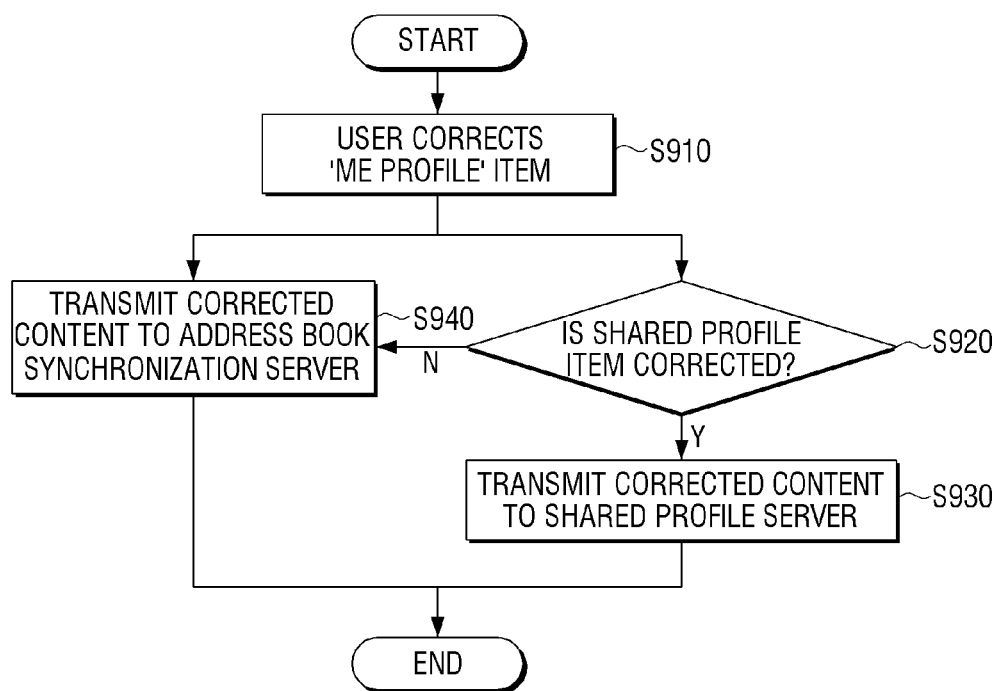
FIG. 9 illustrates a method of controlling a terminal apparatus according to an embodiment of the present invention.

FIG. 9 illustrates a method of controlling a terminal apparatus according to a first embodiment of the present invention.

According to the method of controlling the terminal apparatus shown in FIG. 9, when the first user corrects a 'ME profile' item (refer to FIG. 8) on the terminal apparatus in step S910, it is determined whether the corrected item is the shared profile item in step S920.

When it is determined that the corrected item is the shared profile item in step S920:Y, corrected content is transmitted to a shared profile server in step S930. The shared profile server manages the shared profile information or a function thereof.

When it is determined that the corrected item is not the shared profile item in step S920:N, the corrected content is transmitted to an address book synchronization server in step S940. The address book synchronization server synchronizes contact information stored in the terminal apparatus to manage the contact information or a function thereof.

In the embodiment described above, the server is divided into the address book synchronization server managing the address book and the shared profile server managing the shared profile according to their functions, and it is determined in the terminal apparatus whether a profile item is shared. In an alternative embodiment, when there is a corrected item, it is possible for the corrected content to be transmitted to the server regardless of whether the profile item is the shared profile item, and the server determines whether the corrected content is the shared profile item to manage the corrected content.

Figure 10:
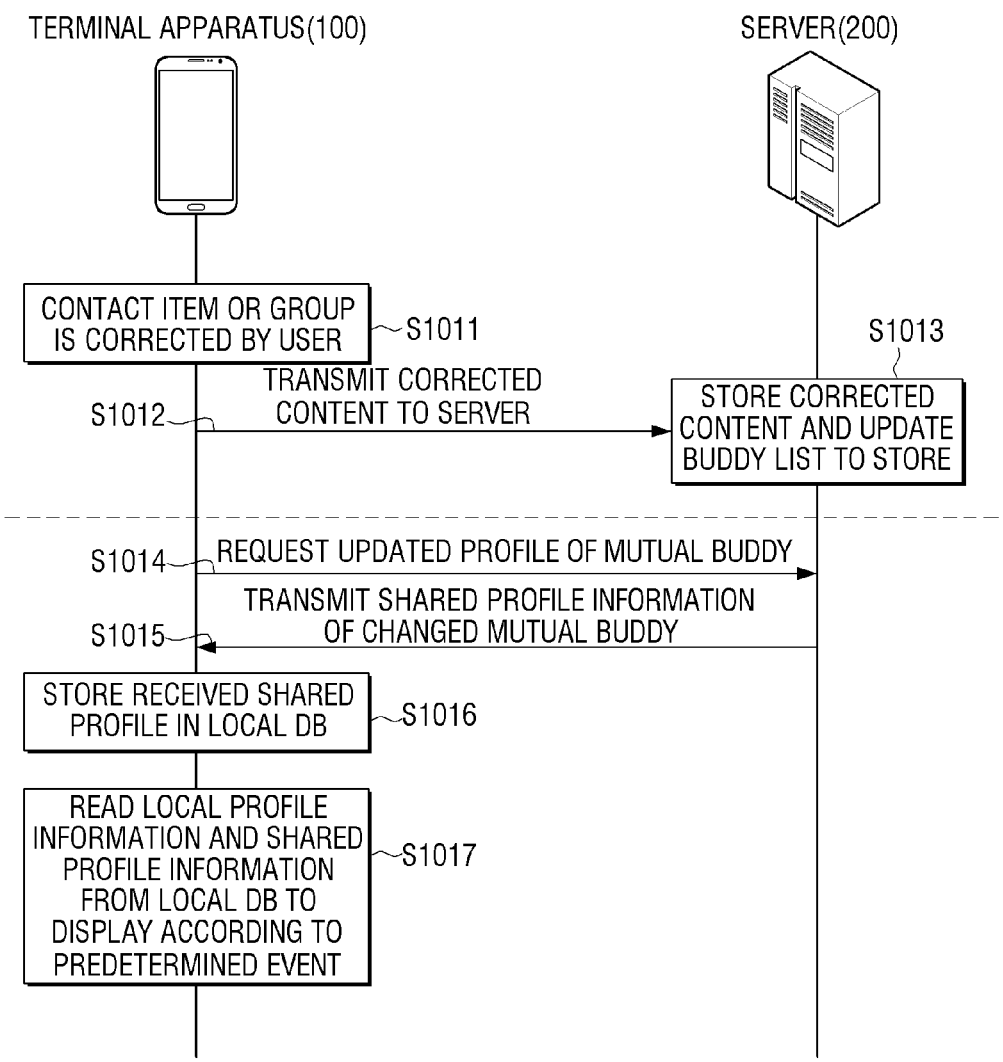
FIG. 10 illustrates a method of operation between a terminal apparatus and a server according to an embodiment of the present invention.

FIG. 10 illustrates a method of operation between the terminal apparatus and the server according to a second embodiment of the present invention.

According to the method of operation between the terminal apparatus and the server shown in FIG. 10, when a contact item or a contact information group (refer to FIG. 8) is corrected in the terminal apparatus 100 by the first user in step S1011, the corrected content is transmitted to the server 200 in step S1012.

The server 200 stores the corrected content, updates a buddy list based on the corrected content, and stores the buddy list in step S1013.

When there is an updated profile request of a mutual buddy in the terminal apparatus 100 in step S1014, and the server 200 transmits shared profile information of the changed mutual buddy to the terminal apparatus 100 in step.

The terminal apparatus 100 stores the received shared profile to a local DB in step S1016.

The local profile information and the shared profile information are read from the local DB in response to an event to display the local profile information and the shared profile information in step S1017.

Figure 11:
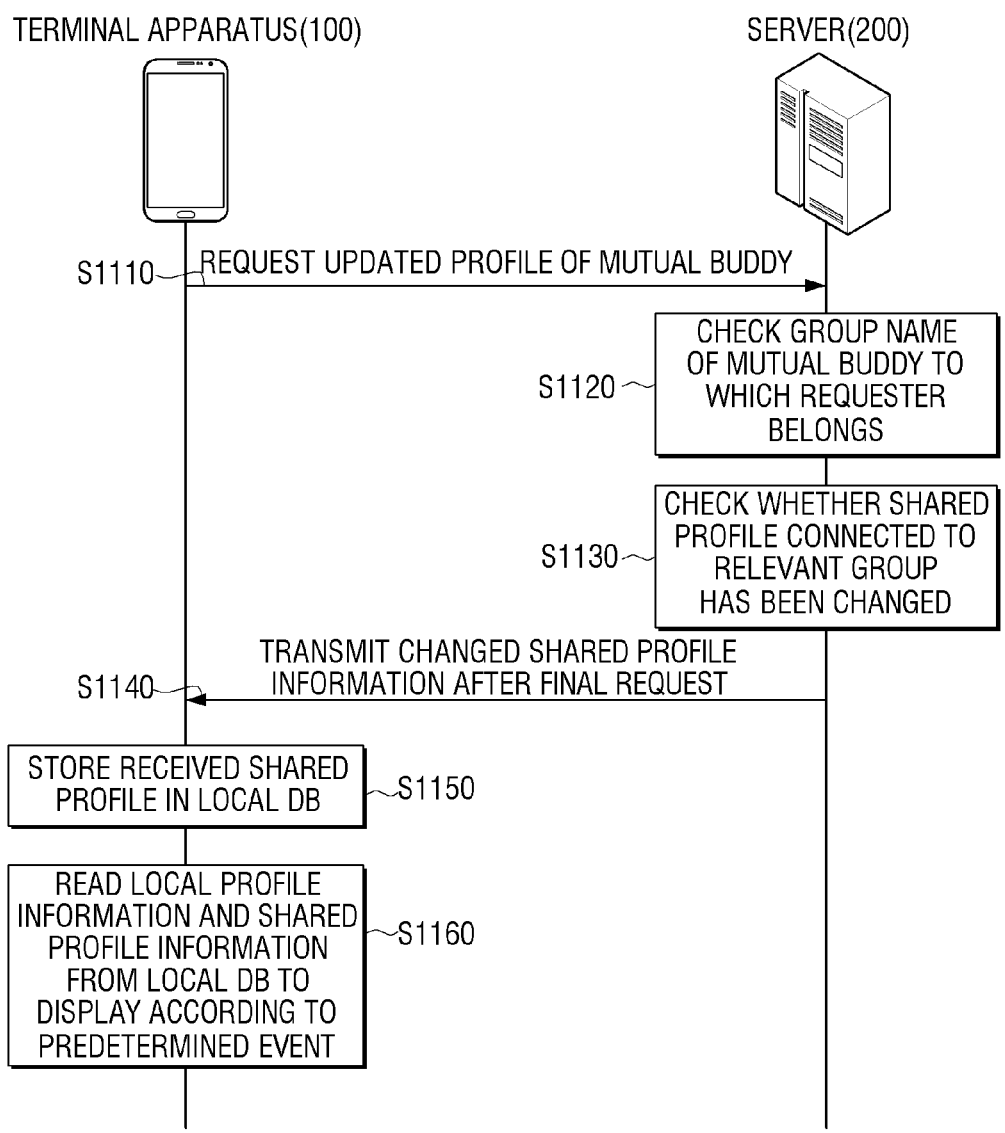
FIG. 11 illustrates a method of operation between a terminal apparatus and a server according to an embodiment of the present invention.

FIG. 11 illustrates a method of operation between a terminal apparatus and a server according to still another embodiment of the present invention.

According to the method of operating the terminal apparatus and the server shown in FIG. 11, when there is an updated profile request of a mutual buddy in the terminal apparatus 100 in step S1110, the server 200 checks a name of group to which the changed mutual buddy belongs in step S1120. It is determined whether the shared profile connected to the group has been corrected in step S1130. The shared profile information changed after a final request is transmitted to the terminal apparatus 100 in step S1140.

The terminal apparatus 100 stores the received shared profile information in the local DB in step S1150.

The local profile information and the shared profile information are read in response to an event to display the local profile information and the shared profile information.

Figure 12:
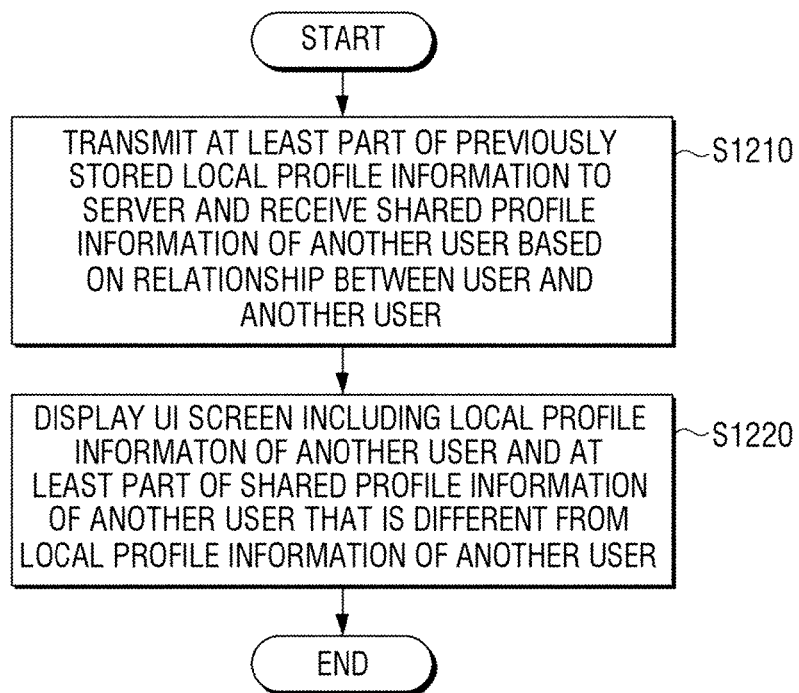
FIG. 12 illustrates a method of controlling a terminal apparatus according to an embodiment of the present invention.

FIG. 12 illustrates a method of controlling the terminal apparatus of the first user according to an embodiment of the present invention.

According to the method of controlling the terminal apparatus of the first user shown in FIG. 12, at least part of the previously stored local profile information is transmitted to the server, and the shared profile information of the second user is received from the server based on a relationship between the first user and the second user. in step S1210. The shared profile information is selectively received from the server, based on the relationship between the first user and the second user according to whether the information of the second user is stored in the terminal apparatus of the first user as the local profile information and the information of the first user is stored in the terminal apparatus of the second user as the local profile information. The UI screen including the local profile information of the second user and at least part of the shared profile information of the second user that is different from the local profile information of the second user is displayed in step S1220.

The UI screen includes the first area including the profile information of the second user, the second area including at least part of the shared profile information of the second user that is different from the local profile information of the second user, and the GUI for storing the shared profile information of the second user as the local profile information.

In the displaying of the UI screen, the shared profile item that is different from the local profile information of the second user among the shared profile information of the second user received from the server is displayed an the area adjacent to the local profile item belonging to the same category as the shared profile item.

When the information of the second user is stored in the terminal apparatus of the first user as the local profile information and the information of the first user is stored in the terminal apparatus of the second user as the local profile information, the relationship between the first user and the second user is set as the buddy relationship. The terminal apparatus displays the profile input screen of the first user including the unshared profile input area and the shared profile input area open to the second user set as having the buddy relationship, and transmits the shared profile information input in the shared profile input area to the server.

The terminal apparatus displays the profile input screen including the shared profile input area open to the second user in the buddy relationship and the unshared profile input area, and transmits the profile information of the first user input in the shared profile input area among the profile information of the first user input through the profile input screen to the server. Alternatively, the terminal apparatus transmits the profile information of the first user respectively input to the shared profile input area and the unshared profile input area to the server by dividing the profile information according to an area.

FIG. 13 illustrates a method of controlling a server according to an embodiment of the present invention.

According to the method of controlling the server shown in FIG. 13, the relationship between the first and second users is set based on the profile information of the second user received from the first terminal apparatus of the first user and the profile information of the first user received from the second terminal apparatus of the second user in step S1310.

When the updated profile information of the first user is received from the first terminal apparatus in step S1320, the shared profile information open to the second user based on the relationship between the first and second users, among the updated profile information of the first user, is transmitted to the second terminal apparatus in step S1330.

Specifically, when setting the relationship between the first and second users, when at least part of the profile information of the second user is received from the first terminal apparatus and at least part of the profile information of the first user is received from the second terminal apparatus, the first user and the second user are set as having the buddy relationship. The shared profile information open to the second user among the updated profile information of the first user in the buddy relationship with the second user is transmitted to the second terminal apparatus.

The at least part of the profile information needed in setting of the buddy relationship includes at least one of a telephone number, an e-mail address, a birthday, an address and a group.

The second user in the buddy relationship with the first user based on contact information group information received from the first terminal apparatus is classified as at least one group, and the updated shared profile information of the first user is open to the second user based on an open level set with respect to at least one group.

According to the present invention as described above, when the profile information of the second user in the buddy relationship with the first user is changed, the change is checked through the phonebook application and updated using the changed profile information when the first user so desires. Thus, user convenience is improved.

The method of controlling the terminal apparatus or the server according to various embodiments described above is realized as a program provided in the terminal apparatus or the server.

For example, a non-transitory computer-readable medium storing a program performing setting the relationship between the first and second users based on the profile information of the second user received from the first terminal apparatus of the first user and the profile information of the first user received from the second terminal apparatus of the second user, receiving the updated profile information of the first user from the first terminal apparatus and transmitting the shared profile information open to the second user based on the relationship between the first and second users, among the updated profile information of the first user, to the second terminal apparatus, is provided in the server.

The non-transitory computer-readable medium is capable of storing data in a semi-permanent form readable by a device, not merely capable of only storing data for a short time period such as a register, a cache, or a volatile memory. Specifically, the various applications or programs described above are stored in a non-transitory computer-readable medium such as a CD, a DVD, a hard disk, a Blu-ray disk, a USB (Universal Serial Bus), a memory card, a ROM (Read-Only Memory), are provided.

While embodiments of the present invention are shown and described above, the present invention is not limited thereto and various changes to the described embodiments could be made without departing from the spirit and scope of the invention as defined by the appended claims.

What is claimed is:

1. A user terminal apparatus, comprising:
a display;
a memory configured to store, for a first user, local profile information of a second user;
a transceiver configured to
transmit at least part of the local profile information to a server, and
receive, from the server, shared profile information which the second user sets to be open to the first user, based on a relationship which shares profile information between the first user and the second user; and
a processor configured to control the display to display a User Interface (UI) screen including the local profile information of the second user and at least part of the shared profile information of the second user that is different from the local profile information of the second user,
display a profile input screen of the first user including both an unshared profile input area for receiving input profile information not open to the second user and a shared profile input area for receiving input profile information open to the second user in the relationship, and
transmit only shared profile information input to the shared profile input area to the server among the shared profile information input to the shared profile input area and unshared profile information input to the unshared profile input area,
wherein the transceiver receives the shared profile information, if information of the second user is stored in a terminal apparatus of the first user as the local profile information and information of the first user is stored in a terminal apparatus of the second user as the local profile information, and
wherein the processor controls the display to display an item among the local profile information as highlighted for a predetermined time if the item is included in the shared profile information of the second user received from the server.

2. The terminal apparatus as claimed in claim 1, wherein the UI screen further includes a first area including the local profile information of the second user, a second area including the at least part of the shared profile information of the second user that is different from the local profile information of the second user, and a Graphical User Interface (GUI) configured to store the shared profile information of the second user in the second area as the local profile information.

3. The terminal apparatus as claimed in claim 2, wherein the processor is configured to control so that a shared profile item that is different from the local profile information of the second user among the shared profile information of the second user received from the server is displayed in an area adjacent to a local profile item that is in an identical category as the shared profile item.

4. The terminal apparatus as claimed in claim 1, wherein the processor sets the relationship between the first user and the second user if the information of the second user is stored in the terminal apparatus of the first user as the local profile information and the information of the first user is stored in the terminal apparatus of the second user as the local profile information.

5. A server comprising:
a transceiver configured to communicate with a first terminal apparatus of a first user and a second terminal apparatus of a second user; and
a processor configured to set a relationship which shares profile information between the first and second users based on profile information of the second user received from the first terminal apparatus and profile information of the first user received from the second terminal apparatus, wherein the processor, in response to having the relationship, is further configured to control the transceiver to transmit, to the second terminal apparatus, shared profile information that is open to the second user, among updated profile information of the first user, when the updated profile information of the first user is received from the first terminal apparatus, and wherein the first terminal apparatus displays a User Interface (UI) screen including a profile input screen of the first user including both an unshared profile input area for receiving input profile information not open to the second user and a shared profile input area for receiving input profile information open to the second user in the relationship and transmits only shared profile information input to the shared profile input area of the profile input screen among the input shared profile information and the input unshared profile information.

6. The server as claimed in claim 5, wherein the processor sets the relationship between the first user and the second user when at least part of the profile information of the second user is received from the first terminal apparatus and at least part of the profile information of the first user is received from the second terminal apparatus, and opens updated shared profile information of the first user in the relationship with the second user to the second user.

7. The server as claimed in claim 6, wherein at least part of the profile information required in setting the relationship includes at least one of a telephone number and an e-mail address.

8. The server as claimed in claim 6, wherein the processor classifies the second user in the relationship with the first user into at least one group based on contact group information received from the first terminal apparatus, and transmits updated shared profile information of the first user open to the second user to the second terminal apparatus based on an open level set with respect to the at least one group.

9. A method of controlling a user terminal apparatus, the method comprising:
transmitting at least part of previously stored local profile information to a server;
receiving shared profile information of another user from a server based on a relationship which shares profile information between a first user and a second user;
displaying a User Interface (UI) screen including local profile information of the second user and at least part of the shared profile information of the second user that is different from the local profile information of the second user;
displaying the UI screen including a profile input screen of the first user including both an unshared profile input area for receiving input profile information not open to the second user and a shared profile input area for receiving input profile information open to the second user in the relationship; and
transmitting only shared profile information input to the shared profile input area of the profile input screen to the server among the input shared profile information and the input unshared profile information, and
wherein receiving the shared profile information comprises receiving the shared profile information, if-information of the second user is stored in a terminal apparatus of the first user as the local profile information and information of the first user is stored in a terminal apparatus of the second user as the local profile information, and wherein the displaying a User Interface (UI) screen including local profile information of the second user and at least part of the shared profile information of the second user comprises displaying an item among the local profile information as highlighted for a predetermined time if the item is included in the shared profile information of the second user received from the server.

10. The method as claimed in claim 9, wherein the UI screen further includes a first area including the local profile information of the second user, a second area including the at least part of the shared profile information of the second user that is different from the local profile information of the second user, and a Graphical User Interface (GUI) configured to store the shared profile information of the second user in the second area as the local profile information.

11. The method as claimed in claim 10, wherein displaying the UI screen includes displaying a shared profile item that is different from the local profile information of the second user, among the shared profile information of the second user received from the server, in an area adjacent to a local profile item that is in a same category as the shared profile item.

12. The method as claimed in claim 9,
wherein if the information of the second user is stored in the terminal apparatus of the first user as the local profile information and the information of the first user is stored in the terminal apparatus of the second user as the local profile information, the relationship is set between the first user and the second user.

13. A method of controlling a server, the method comprising:
setting a relationship which shares profile information between a first user and a second user based on profile information of a second user received from a first terminal apparatus of the first user and profile information of the first user received from a second terminal apparatus of the second user, wherein the first terminal apparatus displays a User Interface (UI) screen including a profile input screen of the first user including both an unshared profile input area for receiving input profile information not open to the second user and a shared profile input area for receiving input profile information open to the second user in the relationship and transmits only shared profile information input to the shared profile input area of the profile input screen among the input shared profile information and the input unshared profile information;
receiving updated profile information of the first user from the first terminal apparatus; and
transmitting, to the second terminal apparatus, in response to having the relationship, shared profile information that is open to the second user, among the updated profile information of the first user.

14. The method as claimed in claim 13, wherein the relationship is set between the first and second user when at least part of the profile information of the second user is received from the first terminal apparatus and at least part of the profile information of the first user is received from the second terminal apparatus, and
wherein transmitting to the second terminal apparatus includes transmitting the shared profile information that is open to the second user among the updated profile information of the first user in the relationship with the second user, to the second terminal apparatus.

15. The method as claimed in claim 14, wherein at least part of the profile information required in setting the relationship includes at least one of a telephone number and an e-mail address.

16. The method as claimed in claim 14, further comprising:
classifying the second user in the relationship with the first user into at least one group based on contact group information received from the first terminal apparatus, wherein the transmitting to the second terminal apparatus further includes transmitting the updated shared profile information of the first user open to the second user to the second terminal apparatus, based on an open level set with respect to the at least one group.

17. A method of displaying a phonebook in a terminal apparatus of a first user, the method comprising:
storing local profile information of at least one second user;
transmitting at least part of each of the local profile information of the at least one second user to a server;
receiving, from the server, shared profile information of at least one buddy user among the at least one second user in response to having a relationship which shares profile information between the first user and the second user;
displaying local profile information of the at least one buddy user and a new profile item that is different from the local profile information of the buddy user among the shared profile information of each of the at least one buddy user;
displaying a User Interface (UI) screen including a profile input screen of the first user including both an unshared profile input area for receiving input profile information not open to the second user and a shared profile input area for receiving input profile information open to the second user in the relationship; and
transmitting only shared profile information input to the shared profile input area of the profile input screen to the server among the input shared profile information and the input unshared profile information,
wherein the at least one buddy user corresponds to a user having a buddy terminal apparatus in which at least part of the profile information of the first user is stored as the local profile information, among the terminal apparatuses of the at least one second user, and
wherein the displaying local profile information of the at least one buddy user and a new profile item comprises displaying an item among the local profile information as highlighted for a predetermined time if the item is included in the shared profile information of the second user received from the server.

18. The method as claimed in claim 17, wherein the at least part of the profile information transmitted to the server is at least one of a telephone number and an e-mail address.

19. The method as claimed in claim 17, wherein displaying the local profile information includes displaying the new profile item in an area adjacent to an item of the local profile information of the buddy user corresponding to a category of the new profile item.

20. The method as claimed in claim 17, wherein displaying the local profile information includes displaying a button configured to store the new profile item as the local profile information of the buddy user.

21. A terminal apparatus of a first user, comprising:
a display;
a memory configured to store local profile information of at least one second user;
a transceiver configured to
transmit at least part of each of the local profile information of the at least one second user to a server, and
receive, from the server, shared profile information of at least one buddy user among the at least one second user in response to having a relationship which shares profile information between the first user and the second user; and
a processor configured to control the display to display local profile information of the at least one buddy user and a new profile item that is different from the local profile information of the buddy user among the shared profile information of each of the at least one buddy user, control the to display a User Interface (UI) screen including a profile input screen of the first user including both an unshared profile input area for receiving input profile information not open to the second user and a shared profile input area for receiving input profile information open to the second user in the relationship, and transmit only shared profile information input to the shared profile input area of the profile input screen to the server among the input shared profile information and the input unshared profile information,
wherein the at least one buddy user corresponds to a user having a buddy terminal apparatus in which at least part of the profile information of the first user is stored as the local profile information, among terminal apparatuses of the at least one second user, and
wherein the processor controls the display to display an item among the local profile information as highlighted for a predetermined time if the item is included in the shared profile information of the second user received from the server.

22. The terminal apparatus as claimed in claim 21, wherein the at least part of the profile information transmitted to the server is at least one of a telephone number and an e-mail address.

23. The terminal apparatus as claimed in claim 21, wherein the processor controls to enable a display of the new profile item in an area adjacent to an item of the local profile information of the buddy user, corresponding to a category of the new profile item.

24. The terminal apparatus as claimed in claim 21, wherein the processor controls to enable a display of a button for storing the new profile item as the local profile information of the buddy user.

* * * * *

UNITED STATES PATENT AND TRADEMARK OFFICE
CERTIFICATE OF CORRECTION

PATENT NO. : 10,084,850 B2  
APPLICATION NO. : 14/250081  
DATED : September 25, 2018  
INVENTOR(S) : Yu-na Kim et al.

Page 1 of 1

It is certified that error appears in the above-identified patent and that said Letters Patent is hereby corrected as shown below:

On the Title Page

(72) Inventors: The sixth named inventor "Soon-Back Cha" should be -- Soon-back Cha --

In the Claims

In Column 24, Claim 21, Line 18, "user, control the to display a User Interface (UI) screen" should be -- user, control the display to display a User Interface (UI) screen --

Signed and Sealed this  
Ninth Day of July, 2019

Andrei Iancu  
*Director of the United States Patent and Trademark Office*